United States Patent [19]

Kondo et al.

[11] 3,926,948

[45] Dec. 16, 1975

[54] ANTIBIOTICS DESTOMYCIN A AND B AND A METHOD FOR PRODUCING SAME USING STREPTOMYCES RIMOFACIENS

[75] Inventors: Shinichi Kondo, Yokohama; Masaji Sezaki; Makiko Koike, both of Tokyo; Masaru Shimura, Yokohama; Eiichi Akita, Tokyo; Kimio Satoh, Kawasaki; Kazuko Hamamoto, Kokubunji; Taro Niida, Yokohama; Takeshi Hara, Tokyo, all of Japan

[73] Assignee: Meiji Seika Kaisha, Ltd., Tokyo, Japan

[22] Filed: Apr. 11, 1967

[21] Appl. No.: 630,084

[52] U.S. Cl............................ 260/210 AB; 424/118
[51] Int. Cl.$^2$ .................. A61K 35/00; C07H 15/20
[58] Field of Search.......... 167/65 AB; 260/210 AB; 424/118

[56] References Cited

UNITED STATES PATENTS

| | | | |
|---|---|---|---|
| 3,067,100 | 12/1962 | Hata et al. | 167/65 |
| 3,100,176 | 8/1963 | Ehrlich et al. | 167/65 |

*Primary Examiner*—Sam Rosen
*Assistant Examiner*—Daren M. Stephens

[57] ABSTRACT

Destomycins A and B and a process for producing said destomycins which comprises cultivating *Streptomyces rimofaciens* ATCC No. 21066 in under submerged aerobic conditions an aqueous carbohydrate solution (pH 6–9 preferably near 7) containing nitrogenous nutrient at a temperature of 25°–30°C, preferably 27°–28°C for 2–4 days until the substantial amount of said antibiotics is produced in said medium and recovering destomycins A and B thus produced from the cultured broth.

9 Claims, 3 Drawing Figures

ANTIBIOTICS DESTOMYCIN A AND B AND A METHOD FOR PRODUCING SAME USING STREPTOMYCES RIMOFACIENS

This invention relates to a new antibiotics, destomycins A and B and also to a process for producing them by the cultivation of *Streptomyces rimofaciens* or its variant.

The new antibiotics destomycins A and B inhibit mainly plant-pathogenic organisms, are effective for inhibiting the growth of Gram-positive bacteria, Gram-negative bacteria, molds and have insecticidal activity.

Destomycin A closely resembles hygromycin B and marcomycin but is clearly differentiated from them in respect of optical activity and antibacterial activity against various bacteria and seems to be different in structure of constituent. Destomycin B also similar to these antibiotics but is clearly differentiated from them in respect of antibacterial activity against various bacteria, particularly against acid-fast bacteria.

Referring to the drawings.

Figure 1:
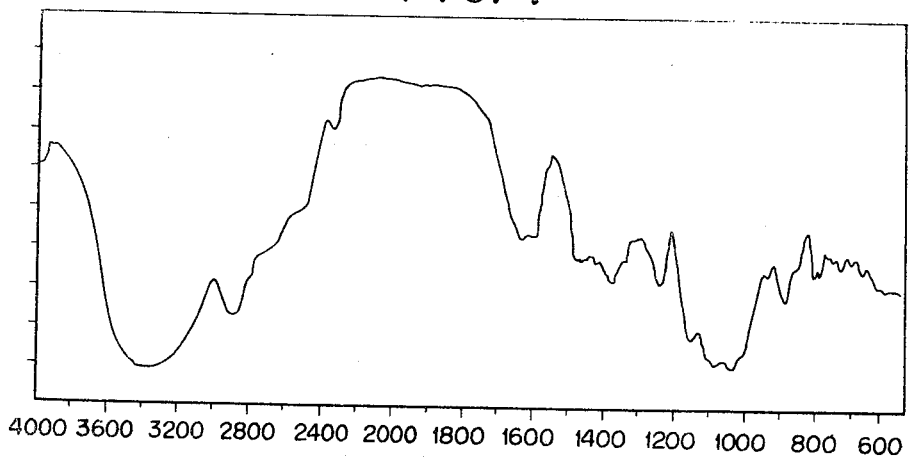
FIGS. 1 and 2 are curves of the infrared absorption spectrum of destomycins A and B taken with potassium bromide respectively.

*Streptomyces rimofaciens* is a new strain which was isolated by inventors from a soil sample collected at Mitsuike park, Tsurumi-ku, Yokohama city and has been deposited in American Type Culture Collection under the ATCC number 21066.

This strain is in possession of following characteristics.

I. Morphological characteristics.
 1. Aerial mycellium: Branching filaments with both primary and secondary whorl formation.
 2. Spores: Oval, 0.6 – 0.8 by 0.8 – 1.3 $\mu$, surface smooth.

II. Cultural characteristics on various media.

| Media | Growth | Aerial mycelium | Soluble pigment | The others |
|---|---|---|---|---|
| Sucrose-Czapek agar (28°C.) | Colorless, weak penetrate into medium | White, with pale pink to pinkish yellow tinge slightly (cottony) | None | |
| Glycerol-Czapek agar (28°C.) | Yellow or greenish yellow, later brownish, thick, good | Thin, poor (powdery) yellowish to pale yellowish green | Brown | |
| Glucose asparagine agar (Krainsky) (28°C.) | Greenish yellow to yellowish brown, penetrate into medium | White, gradually change to light brown or pale yellowish orange, powdery good | Pale yellow to pale yellowish brown | |
| Glucose-asparagine agar (Uschinsky) (28°C.) | Pale brown to pale yellowish brown | Thin, cream to pale greenish yellow, later light brown, powdery | Pale yellowish brown slightly observed | |
| Calcium malate to agar (28°C.) | Colorless, poor | White, cottony, bear slightly | None | |
| Glycerol-calcium malate agar (28°C.) | Pale yellow to yellowish brown gradually | Pale yellow to pale greenish yellow margin of colonies orange, powdery thin | At latter of culture pale brown | |
| Bouillon agar (28°C.) | Good, raised, cracks form, cream to brown | Hardly grow, thick, pale yellow or olive | Dark brown | |
| Glucose-bouillon agar (28°C.) | Raised, wrinkled, cracks form, good, surface cream, reverse brown to dark brown | Cream to pale olive, powdery | Dark brown | |
| Starch ammonium sulfate agar (28°C. | Yellow, observed partly dull brownish spots penetrate into medium | White to pale yellowish orange, lightbrown colonies, cottony good | At latter of culture light brown | |
| Potate plug (28°C.) | Thick raised wrinkled, cream | Powdery, olive to partly yellowish gray or brown with age | None | |
| Carrot plug (28°C.) | not grow | | | |
| Bouillon gelatine medium (28°C.) | Good, cream | Very scant | Brown | After 40 days culture slight liquefaction of gelatine |
| Loeffler's coagulated serum medium (37°C.) | Colonies flat with radial wrinkles, surface cream | Thin, powdery, white | None | No liquefaction |

| Media | Growth | Aerial mycelium | Soluble pigment | The others |
| --- | --- | --- | --- | --- |
| | reverse yellowish brown | | | |
| Egg medium | Thick, very good, brown to yellowish brown, later dull brown | White, thick, good, powdery | None | |
| Skim milk medium (37°C.) | Good, yellowish white | None | Light brown | Coagulation and liquefaction observed |
| Cellulose agar (28°C.) | No growth | | | |

H₂S reaction: (No growth on peptone-iron medium)
Tyrosinase reaction: Negative
Nitrite producing reaction: Negative III. Utilization of carbon sources on Czapek's medium (no growth on Pridham's medium)
Utilized; glucose, fructose, maltose, dextrin, starch, glycerol, mannitol, sorbitol.
Utilization doubtful: galactose, inositol
Not utilized: arabinose, rhamnose, xylose, sucrose, lactose, raffinose, inulin, dulcitol, sodium acetate, sodium citrate, sodium succinate, salicin.

Summarizing the above characteristics of the present strain, the growth on the various media is cream or brown, the aerial mycelium often becomes light yellow, light yellowish orange of olive, occasionally grayish tings. On glycerol synthetic agar medium and organic media of bouillon series, blackish brown pigment produced and aerial mycelium not form spirals but form whirls. On starch synthetic agar, secondary whirls remarkably develope.

Comparing the above characteristics with the known species of Streptomyces described in "The Actinomycetes, Vol. II, Wakasman, 1961," the present strain is most closely related to *Streptomyces olivoverticillatus*.

The principle characteristics of the present strain and *Streptomyces olivoverticillatus* are compared as follows:

| | *Streptomyces olivoverticillatus* | *Streptomyces rimofaciens* |
| --- | --- | --- |
| Marphological characteristics | forms primary and secondary whirls, whirl-formation is most clearly observed on sucrose-ammonium agar. Spores are elliptic (0.6–0.8) | forms primary and secondary whirls. Particularly secondary whirls are formed on starch synthetic agar. Spores are elliptic (0.8×0.8–1.3) |
| Synthetic agar | Growth: trace Aerial mycelium: none Soluble pigment: none | colorless, poor white, sometimes pink to pinkish yellow none |
| Glucose-asparagin agar | Growth: light olive to somewhat dull yellow. Thin Aerial mycelium: partly becomes yellowish brown to yellowish white Soluble pigment: uncertain | penetrate inside, becomes comparatively limitative greenish yellow to yellowish brown powdery, good, light brown, light yellow or light yellowish orange light yellow to light yellowish brown |
| Nutrient agar | Growth: good, brown Aerial mycelium: olive, gray to yellow or green Soluble pigment: brown | cracks appear on colonies powdery, thin bear, becomes olive dark brown |
| Potato plug | Growth: brown Aerial mycelium: yellowish white to yellowish gray Soluble pigment: brown | yellowish brown to brown, thick, good olive, yellowish gray or brown part extend with age none |
| Milk | Growth: brown Aerial mycelium: yellowish white, poor Soluble pigment: brown Peptonization: not clear due to effect of pigment | yellowish white none light brown peptonized after coagulation |
| Hydrolysis of starch | strong | weak |
| Tyrosinase reaction | none | none |
| Utilization of carbon source | | |
| Well utilized | fructose inositol | fructose, sorbitol mannitol, |

| Streptomyces olivoverticillatus | -continued<br>Streptomyces rimofaciens |
|---|---|
| | maltose |
| Utilization — | inositol, galactose |
| doubtful | |

As described above, the present strain closely resembles *Streptomyces olivoverticillatus* on the points that both form whirls, lack spirals, melanine on the organic medium are positive, tyrosinase reaction are negative, liquefaction of gelatine are weak, aerial mycelium are yellowish brown tinge and color of growth are alive on asparagine agar medium. However the main morphological characteristics of the present strain is that remarkable cracks are formed in colonies on bouillon agar and nutrient agar, while *Streptomyces olivoverticillatus* has no such characteristic.

Further, the present strain does not always coincide with *Streptomyces olivoverticillatus* in respect of carbohydrate utilization spectrum and of cultural characteristic such as melamine formation on potato medium. The present strain, therefore, is closely related to *Streptomyces olivoverticillatus* in classification of Streptomyces but can be easily distinguished from the latter by aforementioned characteristics. Moreover, the present strain has new antibiotics-producing activity which is not observed in *Streptomyces olivoverticillatus* so that the present strain appears a novel species and was designated as *Streptomyces rimofaciens* nov. sp. by the present inventors.

*Streptomyces rimofaciens* can be clearly distinguished in classification of Streptomyces from *Streptomyces hygroscopicus* which produces antibiotics hydromycin B or marcomycin resembling with destomycins A and B, on the point that the former forms whirls and not produce hygromycin.

As commonly well known, the cultural characteristics of Streptomyces are liable to vary naturally or artificially. Therefore, in so far as meet the object of this invention destomycin A,B-producing strains such as, for example, the strain closely related to *Streptomyces rimofaciens*, the strain isolated from a soil as their variant, the strain subjected to artificial variation by the method such as, for example, X-ray radiation, ultraviolet ray radiation, use of chemicals can be used in the process of this invention.

On the cultivation of *Streptomyces rimofaciens* the general knowledge regarding the cultivation of Streptomyces may be applied. Nutrient media which are employed in this process includes a source of nitrogen such as, for example, soy bean meal, peanut meal, meat extract, peptone, yeast, protein hydrolyzate, inorganic nitrate, ammonium sulfate and a source of carbon such as, for example, glucose starch, glycerol, molasses. If necessary, suitable inorganic salts, anti-foaming agent and the like may be added to the fermentation medium. The present strain is preferable to be cultured on large scale in an aqueous nutrient medium containg above mentioned nutrient sources, particularly under submerged conditions of agitation and aeration. It is preferable to make the fermentation at 25° – 30°C, especially at 27° – 28°C. The optimum pH of the medium is 6 – 9, preferably near 7.

Destomycins A and B are accumulated mainly in the cultured liquid in submerged cultivation for 2 – 4 days. Though the accumulated amount would be influenced by the cultured conditions, in general destomycin A would be accumulated over 400 mcg/ml and destomycin B over 50 mcg/ml.

To recover destomycins A and B from the cultured broth many means which are usually applied on the known antibiotics may be employed. For example, the desired active, principles may be recovered free from the impurities by utilizing the difference in adsorbing affinity, solubility, distribution coefficient, ionbonding strength between the active principles and the impurities. The active principles may be extracted in the highest yield from the cultured broth by adsorption and elution with ion exchange resin, particularly cation exchange resin of carboxylic acid type. The cultured broth may be treated as it is for recovering the active principles but it is preferable to use the cultured filtrate from which mycelium was removed by filtration and the like. For elution agents, for example, an aqueous solution of ammonia, hydrochloric acid, sulfuric acid, sodium chloride, sodium sulfate and the like or an aqueous lower alcohol solution of them may be used. Among them, aqueous ammonia is the best.

Alternatively, the active principles may be recovered by a method for extracting with an organic solvent in the presence of a carried such as p-toluene-sulfonic acid, lauric acid, oleic acid, and chlorinated phenols, by a method for precipitating by addition of a precipitant such as insoluble solvent or a suitable organic acid to a concentrated solution of the active principles or by a column chromatography with active carbon or alumina etc. These methods may be utilized separately or in combination or repeatedly to recover the active principles in any desired purity. Although both destomycins A and B may be recovered in the form of their acid salts, it is preferable to recover in the form of free bases since they are stable in basic state.

The best method for separating and refining destomycins A and B is to subject to resin-chromatography using anion exchange resin Dowex 1 × 2. That is to say, an aqueous solution of the crude substance containing free bases of destomycins A and B is applied to a column filled with Dowex 1 × 2 and developed with water, whereby destomycin B fraction first and then destomycin A fraction are obtained. By lyophilizing or concentrating each fraction to dryness under reduced pressure, free bases of destomycins A and B may be obtained. By further repeated resin chromatography, pure destomycins A and B may be isolated.

When 5-methyl-$\beta$-naphthalene sulfonic acid is added to an aqueous solution of destomycin A or B white crystals of 5-methyl-$\beta$-naphthalene sulfonate of destomycin A or B are obtained.

The new antibiotic destomycin A obtained by the present process is white crystal and decomposes gradually at 180° – 190°C. The elemental analysis of destomycin A is as follows: C:44.70%, H:7.42%, N:7.73%, O:39. 41%, N—$CH_3$:3.06%, amino N:4.67% (Anal. Calc. for $C_{20}H_{37}N_3O_{13}\cdot H_2O$; C:44.03%, H:7.21%, N:7.70%, O:41.06%, N—$CH_3$ (1):2.76%, amino N (2):5.14%, molecular weight:545.536). The titration equivalent measured in the aqueous solution is 182. The optical rotation is $[\alpha]_D^{22} = +7°$ (C 2, in water). The ultraviolet absorption spectrum (in aqueous solution)

hydroxymethyl)-tetrahydropyran-2''-ylidene}-β-D-talopyranosyl]-1-methylamino-3-amino-1,2,3-trideoxy-myoinositol($C_{20}H_{37}N_3O_{13}$),

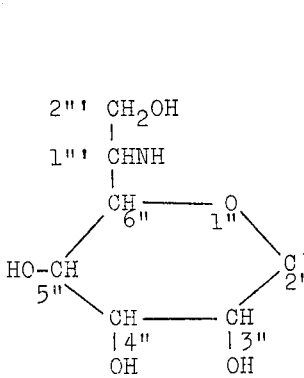
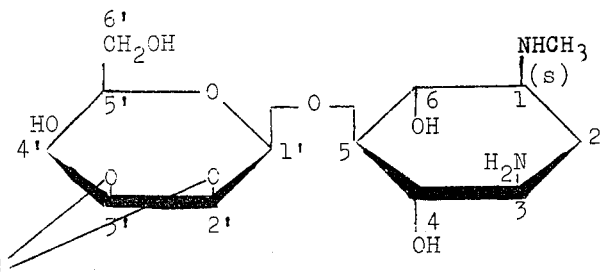

does not show characteristic absorption at 210 – 400 mμ but shows only end absorption. The infrared absorption spectrum taken with potassium bromide is shown in FIG. 1. Destomycin A is soluble in water and lower alcohol and hardly soluble or insoluble in common organic solvent. Rf values of destomycin A when chromatographed on filter paper in 0 by using water-saturated n-butanol, 0.96 by 1.5% aqueous ammonium chloride solution, 0.07 by phenol-water (3:1), 0.07 by aceton-water (1:1), 0.04 by n-butanol-methanol-water (4:1:2), 0 by benzene-methanol (4:1), 0.20 by t-butanol-acetic acid-water (2:1:1), 0.55–0.62 by 80% aqueous methanol containing 15% sodium chloride and gives only one spot respectively. Rf value by thinlayer chromatography on active carbon using methanol: 1/2N sulfuric acid (1:4) as a solvent gives single spots at 0.50 – 0.53 when bioautographed.

Destomycin A gives positive reaction to ninhydrin, anthrone, ehrlich reaction and after hydrolysis red tetrazolium reaction.

5-methyl-β-naphthalene sulfonate of destomycin A is white needle crystal and decomposes at 186°–189°C. The elemental analysis of said sulfonate is as follows: C:51.67%, H:6.21%, N:3.52%, S:7.49%, O:30.63% (Anal. Calcd. for $C_{20}H_{37}N_3O_{13}\cdot3(C_{11}H_{10}SO_3)\cdot H_2O$; C:52.55%, H:5.74%, N:3.47%, S:7.94%, O:30.36%).

Destomycin A is reacted in methanol with acetic anhydride to give white crystal of N-acetyl destomycin A which decomposes gradually at 240° – 260°C. The elemental analysis is as follows: $C_{20}H_{36}N_3O_{14}\cdot3(CH_3CO)$, C:46.36%, H:7.11%, N:6.14%, O:39.39% (Anal. Calcd. for $C_{20}H_{34}N_3O_{13}\cdot3(CH_3CO)\cdot H_2O$: C:46.49%, H:6.75%, N:6.26%, O:40.50%).

When destomycin A is hydrolysed with hydrochloric acid or sulfuric acid three main decomposition products may be obtained. The first product is $C_7H_{16}N_2O_3$ which is a derivative of deoxy-streptamine and which has one amino radical and one N-methyl group. The optical rotation thereof is $[\alpha]_D^{25} = -18°$(C. 2, $H_2O$). It is different cited from a decomposition product of h hygromycin B hyosamine $C_7H_{16}N_2O_3$ (hydrochloride: $[\alpha]_D^{25} = +10.7°$, Journal of Organic Chemistry, Vol. 27, 2793, 1962). The second product is D-talose as in hygromycin B and the third product is a kind of amino acid, molecular formula of which is $C_7H_{15}NO_7$.

As the result of our structural study, we have determined the chemical structure of destomycin A as 5-0-[2',3'-0-{3'', 4'',5''-trihydroxy-6''-(1'''-amino-2'''-

The following table I illustrates the antimicrobial spectrum of destomycins A and B. As is clear from the table, destomycins A and B are effective to bacteria in wide range, in particular, inhibit powerfully various fungi.

Table I

Minimum inhibitory concentration of destomycins A and B (mcg/ml)

| Organism | Destomycins A | B |
|---|---|---|
| Bacillus subtilis ATCC 6633 | 20 | 20 |
| Bacillus subtilis PCI 219 | 20 | 20 |
| Bacillus subtilis NRRL B558 | 20 | 20 |
| Bacillus agri | 20 | 20 |
| Sarcina lutea | 40 | 40 |
| Staphylococcus aureus 209p | 80 | 40 |
| Mycobacterium 607 | 5 | 40 |
| Mycobacterium phlei | 10 | 40 |
| Klebsiella pneumoniae | 40 | 40 |
| Salmonella typhosa | 40 | 20 |
| Salmonella paratyphi A | 40 | 40 |
| Salmonella paratyphi B | 80 | 40 |
| Shigella dysenteriae | 40 | 40 |
| Escherichia coli | 40 | 40/ |
| The above is based upon agar dilution method | | |
| Xanthomonas oryzae | 12.5 | 6.25 |
| Xanthomonas citri | 25 | 25 |
| Xanthomonas pruni | 50 | 25 |
| Piricularia oryzae | 12.5 | 100 |
| Peblicularia sasakii | 1.56 | 6.25 |
| Alternaria tenuis | 0.39 | 0.78 |
| Alternaria kikuchiana | 3.13 | >100 |
| Fusarium graminealum | 1.56 | 6.25 |
| Fusarium lycopers | 25 | 50 |
| Cladosporium herbarum | 1.56 | 1.56 |
| Neurospora sitophila | 12.5 | 50 |
| Penicillium roqueforti | 6.25 | 12.5 |
| Pythium ultinum | 0.39 | 0.78 |
| Aspergillus fumigatus | >100 | >100 |
| Aspergillus clavatus | 100 | >100 |
| Aspergillus terreus | >100 | >100 |
| Aspergillus chevalieri | >100 | 100 |

The above is based upon liquid dilution method Destomycin A is very stable and the depression of the potency thereof is not observed on storage for one month at pH 3.8 – 8.2, 37°C. in an aqueous solution. Even at ph 2.0, 92% of the potency is remained. Further the depression of the potency is not observed even by boiling for 30 minutes in 5% aqueous ammonia.

The toxicity of destomycin A in mice is low. $LD_{50}$ is 5 mg/kg and 50 – 100 mg/kg in intravenous and oral administration respectively. According to bite test against *musca domestica*, destomycin A has a stronger insecticidal activity than destomycin B. Sugared water containing 500 mcg/ml of destomycin A showed mortality rate of 70 – 95% of *musca domestica* in 4 – 7 days.

Comparing destomycin with the known antibiotics in respect of above mentioned characteristics, destomycin A closely resembles hygromycin B or marcomycin but is differentiated from the on optical rotation, molecular formula and molecular weight as shown in the following table II.

Table II

|  |  | Destomycin A | Hygromycin B | Malcomycin |
|---|---|---|---|---|
| $[\alpha]_D^{22}$ |  | +7° (C=2, $H_2O$) |  | +19.2° (C=1, $H_2O$) |
| Elemental analysis | C | 44.70 | 45.77, 45.27 | 46.40 |
|  | H | 7.42 | 7.63, 7.55 | 7.48 |
|  | N | 7.73 | 6.92, 7.13 | 6.82 |
|  | O | 39.41 |  | 39.30 |
| Molecular formula |  | $C_{20}H_{39}N_3O_{14}$ | $C_{15}H_{28}N_2O_{9-10}$ | $C_{15}H_{30}N_2O_9$ (Empirical formula) |
| Molecular weight |  |  |  |  |
| Calc. |  | 545.536 | — | — |
| Found |  | 567(titration equivalent 189) | 398 ± 8 | 436 |

As it is clear from the table II destomycin is entirely different from them in respect of molecular formula and molecular weight. Further in respect of the optical rotation destomycin A is clearly different from marcomycin.

Basing upon the results mentioned above we have acknowledged that destomycin A is new antibiotics.

Figure 2:
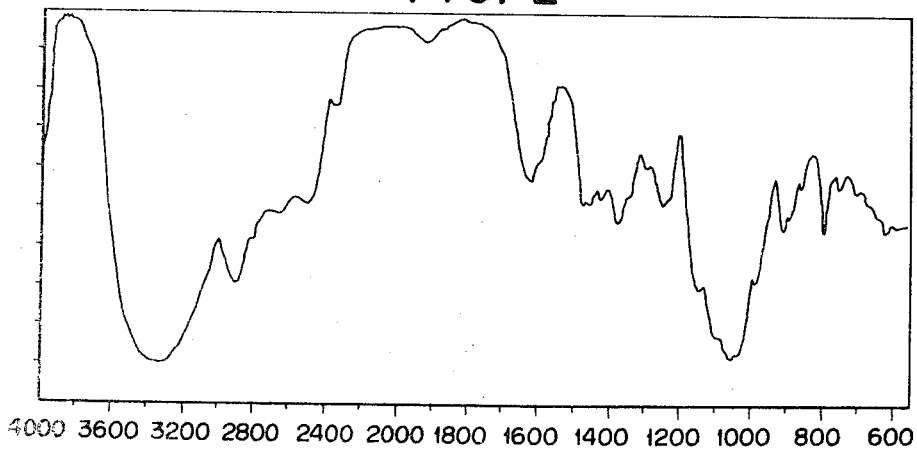

A new antibiotic destomycin B obtained by the present process is white crystal and decomposes gradually at 140° - 200°C. The elemental analysis of destomycin B is as follows: C:45.34%, H:7.37%, N:7.69%, O:39.40%, N—$CH_3$:3.98%, amino N:2.57 (Anal. calcd, for $C_{21}H_{41}N_3O_{14}$, C:45.07%, H:7.39%, N:7.51%, O:40.03%, N—$CH_3$ (2):5.37%, amino N (1):2.50%, molecular weight:559.562). The titration equivalent measured in the aqueous solution is 190. The optical rotation is $[\alpha]_D^{21} = +6°$(in 1% aqueous solution). The ultraviolet absorption spectrum (in aqueous solution) does not show characteristic absorption at 210 – 400 m$\mu$ but shows only end absorption. The infrared absorption spectrum when pelleted in potassium bromide is shown in FIG. 2.

The solubility in various solvent, filter paper- and thin layer-chromatography and color reaction of destomycin B are very similar to those of destomycin A.

The antimicrobial spectrum of destomycin B is as shown in the table I and is effective to bacteria and fungi in wide range but the antibacterial activity against acid fast bacteria is ¼ - ⅛ of that of destomycin A.

On storage for one month at pH 2.0 – 8.2, 37°C. only 10 – 20% depression of the potency is observed. Even by boiling for 30 minutes in 5% aqueous ammonia only 15% of the potency is depressed.

The toxicity of destomycin B in mice is low. $LD_{50}$ is about 5 mg/kg and about 50 mg/kg in intravenous and oral administration respectively.

Figure 3:
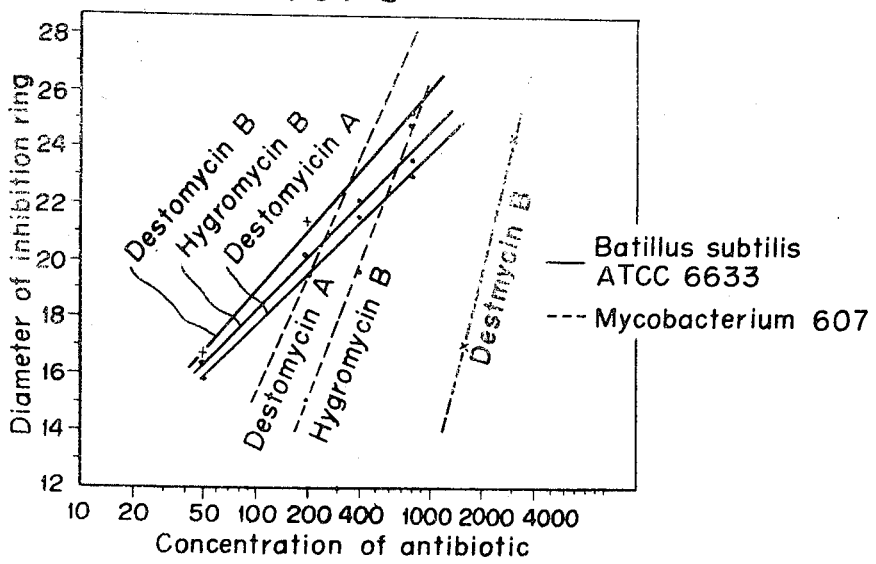
FIG. 3 shows spreading curves of destomycins A and B hygromycin B measured by cup method on agar plate, using *Bacillus subtilis* ATCC 6633 and Mycobacterium 607 as the test bacteria.

From the characteristics mentioned above, destomycin B can be clearly distinguished from destomycin A and hygromycin B. As shown in FIG. 3, the antibacterial activity against *Bacillus subtilis* ATCC 6633 and Mycobacterium 607 measured by cup method on agar plate indicates that these three antibiotics are clearly different from each other.

We have acknowledged from the results described above that destomycin B is a new antibiotics since we have found no antibiotics resembling destomycin B among the known antibiotics.

The potency of destomycin A was assayed by cup method on agar plate using *Bacillus subtilis* ATCC 6633 and Mycobacterium 607 as assay organisms. The potency of destomycin B also was assayed in the same manner, using purified destomycin A as standard. The potency of purified destomycin B was 1600 u/mg in case *Bacillus subtilis* ATCC 6633 was used as assay organism and about 100 u/mg in the case of Mycobacterium 607.

The present invention is illustrated in detail by way of the following examples in which the potency was assayed using *Bacillus subtilis* ATCC 6633 as assay organism.

EXAMPLE 1

*Streptomyces rimofaciens* cultured on a glucose-asparagine agar slant medium was inoculated to a liquid medium (pH 7.0) containing 2% glucose, 1% peptone, 0.3% meat extract, 0.05% $K_2HPO_4$ and cultured at 28°C. for 48 hours under submerged aeration condition to give a seed culture. 5% of said seed culture was inoculated to 12 l. of a liquid medium (pH 7.2), containing 2.5% glucose, 3.5% soybean meal, 0.5% soluble vegetable protein, 0.25% table salt and 0.4% soybean oil, in a 20 l. volume glass fermentor and cultured at 28°C. for 65 hours under submerged aeration conditions. The cultured medium was filtered using "Hyflo supercel" (Johns-Manville Corp.) as a filter-aid to gave 9.5 l. of filtrate (pH 6.4, 450 u/ml.). The filtrate was applied to a column filled with 300 ml. of Amberlite IRC 50 ($NH_4^+$ type) (Rohm & Haas Co. cation exchange resin of carboxylic acid type). The column was washed with water and eluted with 2% aqueous ammonia. The 300 ml. of the active elute was concentrated under reduced pressure to dryness to gave a crude brown powder (400 u/mg) containing 4.4 g. of destomycins A and B. 2.2 g. of the powder was dissolved in 10 ml. of water and applied to a column filled with 80 ml. of Dowex 1 = 2 ($OH^-$ type) (50 – 100 mesh, anion exchange resin, Dow chemicals Incorp.) and developed with water. The eluate was fractionated to each 10 ml. Destomycin B was eluted in 10 – 13th tubes and destomycin A in 15 – 24th tubes.

The 16 – 20th fractions of destomycin A were combined and applied to a column filled with 5 g. of active carbon, washed with 200 ml. of water and eluted with one-fifth N sulfuric acid. The active eluate was adjusted to ph 4.0 with Amberlite IR 45 ($OH^-$ type) and lyophilized to gave 330 mg. of white powder (890 u/mg.) of destomycin A sulfate. Yield was 61 mg. per 1 l. of the cultured filtrate.

The fractions of destomycin B were combined and concentrated under reduced pressure to dryness to give 450 mg. of crude powder (750 u/mg.) of destomycin B base. 150 mg. of the base was dissolved in 5 ml. of water and applied to a column filled with 2.5 g. of refined active carbon. The column was washed with 100 ml. of water and eluted with 1/5 N sulfuric acid. 180 ml. of the active eluate was adjusted to pH 5.6 with Amberlite IR 45 (OH⁻type) and lyophilized to give 76 mg. of white powder (980 u/mg) of destomycin B sulfate. Yield was 23 mg. per 1 l. of the cultured filtrate.

EXAMPLE 2

The seed culture of *Streptomyces rimofaciens* was inoculated to 1000 l. of the liquid medium as in Example 1 in 200 l. volume fermentation tank and cultured at 28°C. for 68 hours under submerged aeration condition. The cultured medium was filtered using Hyflo Supercel as a filter-aid and washed with water to gave 950 l. of a cultured filtrate (pH 7.0, 230 u/ml.). The filtrate was applied to a column filled with 12 l. of Amberlite IRC 50 (Na⁺ type), washed the column with water and eluted with 2% aqueous ammonia. The active portion 20.8 l. of the elute was applied to a column filled with 1 kg. of refined active carbon. The column was washed with 30 of water and eluted with 1 N sulfuric acid. The active portion 12.6 l. of the elute was adjusted to ph 6.8 with Amberlite IR 45 (OH type) and applied to a column filled with 700 ml. of Amberlite IRC 50 (NH₄⁺type). The column was washed with water and eluted with 2% aqueous ammonia. The active portion 2.5 l. of the elute was concentrated to 215 ml. under reduced pressure. The concentrate was applied to a column filled with 1600 ml. of Dowex 1 × 2 (CH⁻ type, 50 – 100 mesh) and developed with water. The elute was fractionated to each 20 ml. Destomycin B was eluted in 64th – 73rd tubes and destomycin A in 76th – 300th tubes. The fractions of destomycin A were combined and lyophilized to gave 69.5 g. of white powder (1000 u/mg.) of destomycin A. Yield was 73 mg. per 1 l. of the cultured filtrate.

The fractions of destomycin B were collected and lyophilized to gave 11.9 g. of crude powder (530 u/mg.) of destomycin B. Yield per 1 l. of the cultured filtrate was 4 mg. as refined destomycin B.

Example 3

6.6 g. of crude powder (530 u/mg.) of destomycin B was dissolved in 50 ml. of water. The solution was applied to a column filled with 50 ml. of Amberlite CG-50 (NH₄⁺ type). The column was washed with 250 ml. of water and eluted with 0.5% aqueous ammonia. 130 ml. of highly active elute were combined and concentrated to 18 ml. under reduced pressure. The concentrate was applied to a column filled with 400 ml. of Dowex 1×2 (OH⁻ type, 50×100 mesh) and developed with water. 160 ml. of highly active elute was lyophilized to give 1.1 g. white powder (1600 u/mg.) of destomycin B.

Example 4

100 mg. of destomycin A (1000 u/mg.) and 200 mg. of sodium 5-methyl-beta-naphthalene sulfonate were added to 3 ml. of water and heated at 60°C. to dissolve. The solution was added with 0.3 ml. of 1 N Hydrochloric acid to adjust to ph 6.8 and cooled to gave 52 mg. of white crystals. Recrystallization from 2 ml. of warmed water gave 30 mg. of white needle crystals (490 u/mg.) of 5-methyl-beta-naphthalene sulfonate of destomycin A. Decomposition point: 186°–189°C.

We claim:

1. An antibiotic substance, destomycin A, effective in inhibiting the growth of Gram-positve bacteria, Gram-negative bacteria and molds, which is white powder, decomposes gradually at 180°– 190°C, the elemental analysis: C:44.70%, H:7.42%, N:7.73%, O:39.41%, N—CH₃:3.06%, amino N:4.67, exhibits titration equivalent of 182 (in aqueous solution), exhibits [ $\alpha$ ]$_D^{22}$ = +7° (C 2, in water), exhibits no characteristic absorption of ultraviolet absorption spectrum at 210 – 400 m$\mu$ but only end absorption, gives a positive reaction to ninhydrin, anthrone, ehrlich reaction and after hydrolysis red tetrazolium reaction, 5-methyl- $\beta$ - naphthalene sulfonate of destromycin A being whitle needle crystals, being decomposed at 186° – 189°C, elemental analysis being C:51.67%, H:6.21%, N:3.52%, S:74.9%, 0:30.63%, N-acetyl destomycin A being white crystals, being decomposed gradually at 240° – 260°C, elemental analysis being C:46.36%, H:7.11%, N:6.14%, 0:39.39%, the chemical structure of destomycin A being 5-0-[2', 3'-0-[3'', 4''', 5''-trihydroxy-6''-(1'''-amino-2'''-hydroxymethyl)-tetrahydropyran-2''-ylidene] $\beta$ -D-talopyranoryl]-1-methylamino-3-amino-1,2,3 -trideoxy-myoinositol ($C_{20}H_{37}N_3O_{13} \cdot H_2O$).

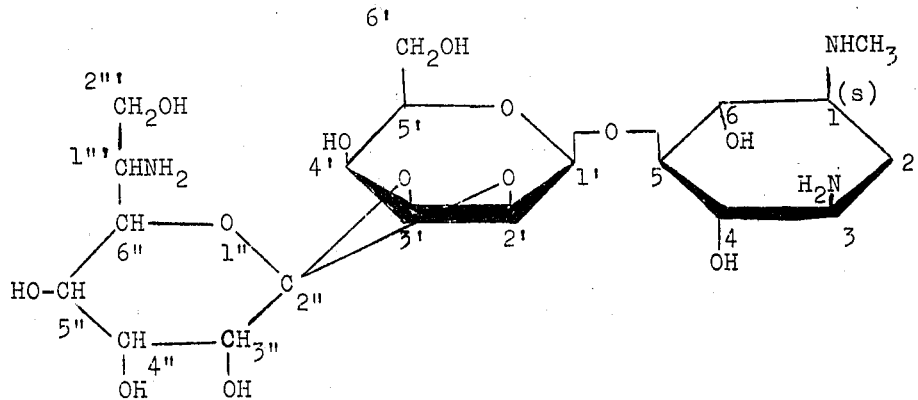

2. An antibiotic substance, destomycin B, effective in inhibiting the growth of Gram-positive bacteria, Gram-negative bacteria and molds, which is a white powder, decomposes gradually at 140°– 200°C, has the elemental analysis C:45.34%, H:7.37%, N:7.69%, O:39.40%, N—CH3:3.98%, amino N : 2.57%, exhibits titration equivalent of 190 (in aqueous solution) exhibits $[\alpha]_D^{21} = +6°$ (in 1% aqueous solution), exhibits no characteristic absorption of ultraviolet absorption spectrum at 210 – 400 m$\mu$ but only end absorption and has an infrared absorption spectrum as shown in FIG. 2.

3. A process for producing a biologically active substance, identified as destomycin A and B, which comprises cultivating a destomycins A and B-producing strain of *Streptomyces rimofaciens* ATCC No. 21066 under submerged aerobic conditions in an aqueous carbohydrate solution containing nitrogenous nutrient until the substantial amount of said antibiotics is produced in said medium and recovering destomycins A and B thus produced from the cultured broth.

4. A process for producing destomycins A and B which comprises cultivating *Streptomyces rimofaciens* ATCC No. 21066 in under submerged aerobic conditions an aqueous carbohydrate solution (pH 6 – 9 preferably near 7) containing nitrogenous nutrient at a temperature of 25° – 30°C, preferably 27° – 28°C. for 2 – 4 days until the substantial amount of said antibiotics is produced in said medium and recovering destomycins A and B thus produced from the cultured broth.

5. A process claimed in claim 3, which comprises recovering the active principles free from impurities by utilizing the difference in adsorbing affinity, solubility, distribution coefficient, ionbonding strength between the active principles and the impurities.

6. A process claimed in claim 3 which comprises recovering the active principles free from impurities from the cultured broth oy adsorption and elution with ion exchange resin, particularly cation exchange resin of carboxylic acid type.

7. A process claimed in claim 3 wherein the adsorbed principles are eluted with aqueous ammonia.

8. A process claimed in the claim 4, which comprises recovering the active principles free from impurities by utilizing the difference in adsorbing affinity, solubility, distribution coefficient, ion-bonding strength between the active principles and the impurities.

9. A process claimed in the claim 4, wherein the adsorbed principles are eluted with aqueous ammonia

* * * * *